UNITED STATES PATENT OFFICE.

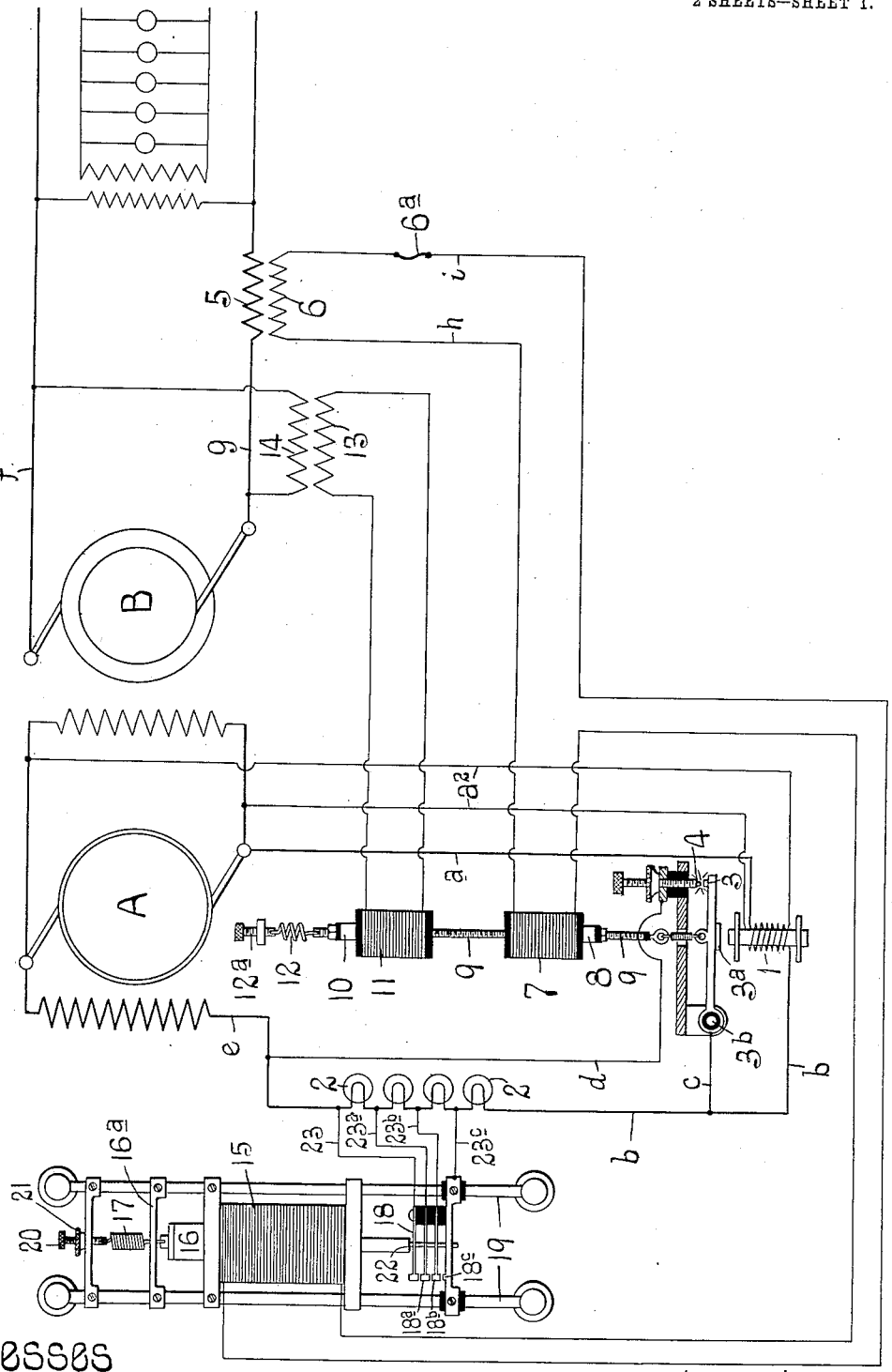

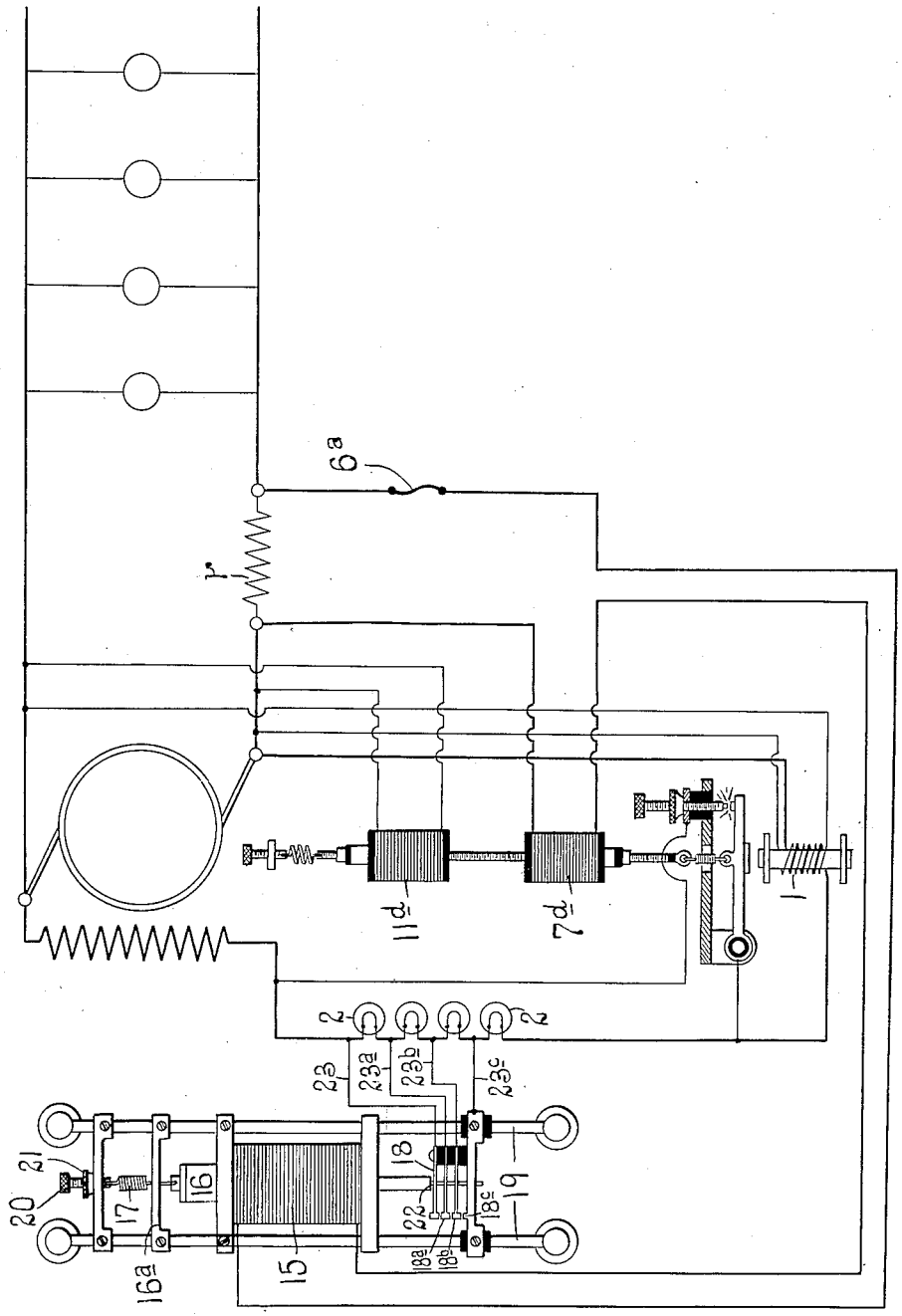

GEORGE S. NEELEY, OF ST. LOUIS, MISSOURI.

FIELD-REGULATOR FOR DYNAMOS.

No. 862,272.   Specification of Letters Patent.   Patented Aug. 6, 1907.

Application filed June 18, 1906. Serial No. 322,209.

*To all whom it may concern:*

Be it known that I, GEORGE S. NEELEY, a citizen of the United States, residing at St. Louis, Missouri, have invented a certain new and useful Improvement in Field-Regulators for Dynamos, of which the following is a full, clear, and exact description, such as will enable others skilled in the art to which it appertains to make and use the same, reference being had to the accompanying drawings, forming part of this specification, in which—

Figure 1 is a diagrammatic view illustrating my improved regulator as employed in connection with an alternating current system; and Fig. 2 is a similar view showing my improvement as used in connection with a system having self-exciting dynamo.

This invention relates to a new and useful improvement in means for regulating the fields of dynamos, the object being to maintain a constant voltage in the work circuit of the system.

My present improvement is applicable particularly to the regulating system shown and described in an application serially numbered 271,980, filed by me July 31, 1905, and consists essentially in providing my said regulating system with resistances and means for automatically cutting in and cutting out said resistances, whereby the regulating system of my aforesaid application is capable of taking care of a wider range of work and dynamos of much larger capacities. My present improvement may be said, therefore, to be an addition to the system of my aforesaid application.

According to the system disclosed in my aforesaid application, there is a variable resistance, in the form of an arc, in the field circuit of the generator, or exciter as the case may be, and this arc is controlled by two main magnets. One magnet is influenced by the intensity of the current output of the generator, while the other is controlled by the intensity of the shunt field exciting current when regulating the field of a direct current dynamo, or by the exciter field current when regulating an alternating dynamo. These magnets act upon an armature carrying the movable contact of the arc, and are opposed to each other, one magnet tending to increase and the other magnet tending to decrease the length of the said arc. There is a third electro-magnet in my system which is energized by the voltage of the current supplied to the system for the purpose of compensating in field resistance particularly for decreased or increased speeds.

Resistances, preferably in the form of specially made incandescent lamps with special carbon filaments, are arranged in the shunt field circuit of the exciter, or in the shunt field circuit of the working dynamo, if self-exciting. This carbon resistance has a negative temperature coefficient, which is very desirable as it relieves the contacts of the variable resistance. This specialized form of resistance is not, however, so particularly essential to my present improved system, since I am now enabled by auxiliary apparatus to automatically reduce or increase the effectiveness of the resistance progressively as the current output in the working circuit is increased or reduced.

In the accompanying drawings the incandescent lamps forming the resistances are connected in series, a tap being provided between two adjacent lamps, whereby one or all of the lamps may be automatically cut in or out as a resistance successively, as the load on the work circuit is increased or reduced. The means for controlling these resistances is the same in both systems of regulation, and is as follows:

15 indicates an auxiliary magnet energized by the work circuit and which is also in series with the main magnet 7. Magnet 15 has an armature core 16, which core is connected to a spring 17, the tension of which spring is adjustable by means of the screw 20 and jam nut 21. The lower end of the armature 16 is preferably reduced to form a shoulder 22, and passes loosely through registering openings in a series of contact making and breaking springs forming the terminals 18, 18$^a$, 18$^b$ and 18$^c$ of the tap wires 23, 23$^a$, 23$^b$ and 23$^c$ arranged between the incandescent lamps 2 forming the resistance hereinbefore referred to.

The auxiliary solenoid magnet 15 and associate parts just above described are preferably mounted on vertical rods 19, being made adjustable on said rods by means of appropriate set screws, whereby they may be adjusted with relation to each other. A bar 16$^a$ is adjustably mounted on the rods 19 above the armature core of the solenoid so as to limit the upward movement thereof. The tension of spring 17 can thus be regulated while the core remains fixed. When the spring 17 is under great tension it is obvious that the magnetic strength exerting a pull on the core 16 must be sufficient to overcome the tension of spring 17 before the core can be drawn down.

In the system disclosed in my aforesaid application the resistance in the shunt field circuit of the exciter (or working dynamo) was capable of use in connection with dynamos up to two hundred kilowatts. In larger machines, however, it is necessary to provide a resistance having a much larger ampere carrying capacity, so as to take care of the greater intensities of field currents in connection with said larger machines. In lighting and power plants various arrangements are provided for taking care of the service at different periods in day and night, and it is obvious that where large machines, say those having a capacity of one thousand kilowatts, are used, such machines be employed only at a time when they can be operated economically. It is for such machines that my present improvement is especially adapted, and in order to understand the operation of the automatic control of the field resistance it is only necessary to say that when the machine is running under a light load and normal voltage all of the effective regulating resistance 2 is then normally in the shunt field circuit. As the load on the dynamo increases, the current output as well as the field current of the dynamo is increased to meet the new demands, and this current output has a direct influence upon the auxiliary solenoid magnet 15 as well as the main regulating magnet 7.

The spring 17 is so adjusted that all of the incandescent lamps remain in series as a resistance up to some arbitrary point at which the magnetic pull exerted on the core 16 would counterbalance the spring 17 and move the uppermost terminal spring 18 into contact with its next adjacent terminal spring $18^a$, thus short-circuiting the first one of the lamps in the series, and destroying its value as a resistance. Under these conditions the apparatus would work while the dynamo was operating under increasing loads until the current output was such that the magnet 15 responding thereto would cause the second lamp to be short-circuited by the contact spring $18^b$ impinging against the contact $18^c$, and thereby cut it out as a resistance. The point where any of the lamps are to be cut out can be accurately adjusted. In actual practice I have adjusted the parts so that the lamps in series are repeatedly cut in and out at approximately the same point in the intensity of the current output of the system. As the load increases after the second lamp is cut out it is obvious that the increased current output of the machine will eventually cause the third lamp to be cut out in the same manner as the first one; but the current output of the system will then be three times as great as when the first lamp was cut out. This reduction in the resistance in the field circuit enables more of the field current to travel through the remaining lamps that are left in circuit, which tends to relieve the contacts 3 and 4. When operating under full load the resistance of all the lamps is cut out except that of the one lamp at the bottom of the series, in this instance, which is always in the field circuit.

It is obvious that instead of having the special form of resistance hereinabove referred to, resistance of a different type and character could be cut in and out by moving an arm across a series of terminal contacts such, for instance, as an ordinary rheostat.

When the load is decreased on the working circuit there is, of course, a corresponding diminution in the current output of the dynamo which reduces the strength of the magnet 15, and consequently additional resistance is cut into the field circuit, by the opposing action of the spring 17.

Having described the essential features of my present invention I will now briefly describe the system of regulation which forms the subject-matter of my aforesaid application Serial No. 271,980.

In Fig. 1, which is a diagrammatic illustration of an alternating current system with which my improved regulating system is employed, the exciter field circuit passes through wire $a$ to a magnet 1, beyond which magnet the circuit is divided into two branches $b$ and $c$. In branch $b$ of the circuit is arranged the sectional resistance 2, preferably in the form of specialized incandescent lamps, or other resistance, whose temperature coefficient is negative.

In the branch $c$ is a movable contact 3 carried by an armature $3^a$ pivotally mounted at $3^b$ so as to be influenced by magnet 1. Contact 3 coöperates with a contact 4 from which leads a wire $d$ back to the return wire $e$ of the exciter field circuit. The branch $b$ of the circuit containing the resistances 2 unites with the wire $d$ of the branch $c$, the circuit passing through the two branches combining at this point and returning through the wire $e$.

In operation, the arc between the contacts 3 and 4, when said contacts are separated, constitutes a variable resistance which, increasing, will cause the current to flow through the resistance 2 or such portion thereof as is in service.

$f$ and $g$ indicate the main line wires of the working system leading to and from the brushes of the generator B.

5 indicates the primary coil of a series or current transformer, from the terminals of the secondary winding 6 of which lead wires $h$ and $i$ to and from the coil of a solenoid magnet 7 whose core 8 is connected by a rod 9 to the movable contact 3. Magnet 7 being in opposition to magnet 1 tends to close the contacts 3 and 4 and reduce the arc, and consequently the resistance in the exciter field, while magnet 1 tends to separate the contacts 3 and 4 and increase said variable resistance. Rod 9, which connects the core 8 with the movable contact 3, extends through the magnet 7 and carries at its opposite end a solenoid core or armature 10 arranged in a magnet 11. A spring 12 is connected to rod 9 and its carried core 10, its tension being initially adjusted by screw eye $12^a$ to close the contacts 3 and 4, and assist the pull of the solenoid 7 and resist the counter-magnetic action resulting from the force of the solenoid 11 and magnet 1. This solenoid magnet 11 is energized by the voltage of the current supplied to the system and assists primarily in making compensation in the field resistance when variations occur in the voltage resulting from the fluctuations in the speed, and also assists in the regulation of the movable contact 3 when the voltage is increased or decreased from natural causes, as, for instance, when the current in the working circuit is increased or decreased. This solenoid magnet 11 which heretofore I have referred to as a "third electro magnet", is preferably in the circuit of the secondary winding 13 whose primary 14 is across the lighting or work system.

$a^2$ is a circuit across the brushes of the exciter A which includes an auxiliary winding of magnet 1 parallel to the coil or winding of said main magnet, which is a part of the field circuit $a$. The purpose of this arrangement is to furnish a means of compensation whereby a constant voltage may be maintained in extreme cases of hysteresis or heat losses; as it is well known in the art that when the dynamo and its exciter heats up considerably the loss of voltage, due to the heating up of the iron magnet cores, is sometimes very considerable. This secondary coil in the circuit $a^2$ is used in my present system for this sole purpose, its action being as follows: The energy of the magnet 1 now being partly due to the action of the voltage of the intensity of the field current that passes through the main field circuit $a$, $b$, $c$, $d$, $e$, will, when the exciter or dynamo voltage drops, due to excessive heating, cause a corresponding weakening of magnet 1, then magnet 7 pulls the contact 3 close to contact 4. This causes the field current of the exciter or working dynamo to increase, which effectively keeps the exciter voltage from dropping to a point where it will be noticed in the voltage of the work circuit. Thus, by the addition of the circuit $a^2$ and extra parallel winding on magnet 1, there is an automatic differential action taking place, which allows the field current to increase when the voltage decreases due to heating or any other cause.

In Fig. 2 I have shown my improved apparatus arranged in a system wherein the dynamo is self-exciting. In this form the operation is precisely the same as that hereinbefore described with reference to the alternating current system, with the exception that the series transformer and the potential transformer are of course unnecessary, the series transformer being replaced by a resistance marked $r$ in the work circuit, which shunts a current proportional to the current in the work circuit through the solenoid magnet $7^d$. The potential magnet $11^d$ is energized by the voltage of the work circuit, it being connected across the main line wires of the work circuit. The extra circuit $a^2$ in Fig. 1 is still retained and is merely shown connected across the brushes of the working dynamo, in Fig. 2, for the purpose of better showing the adaptability of my system of regulation to either alternating or direct current systems. It is obvious that in the case of Fig. 2 the magnet $11^d$ could be dispensed with and its function performed entirely by the auxiliary winding on the magnet 1, since their energizing sources are the same.

$6^a$ is a fuse in the circuit containing the magnet 7 (or $7^d$).

Having thus described the invention, what is claimed as new and desired to be secured by Letters Patent is:

1. In a system for regulating the field circuit of dynamo electric machines, the combination with a resistance in said field circuit, a working circuit, means controlled by said working circuit for cutting in and cutting out portions of said resistance, a variable resistance in said field circuit coöperating with said first-mentioned resistance, and magnetically operated means for varying the last-mentioned resistance; substantially as described.

2. In a system for regulating the field circuit of dynamo electric machines, the combination with a resistance in said field circuit, a working circuit, means controlled by said working circuit for cutting in and cutting out portions of said resistance, a variable resistance in said field circuit coöperating with said first-mentioned resistance, and means for varying the last-mentioned resistance in response to differential magnetic forces resulting from placing the intensity of the field current in magnetic opposition to the intensity of the current output of the generator; substantially as described.

3. The improvement in the art of regulating an alternating current generator, the field of which is energized by an exciter, the same comprising, in combination a sectional resistance and a variable resistance in series with the field of the exciter, means for controlling said sectional resistance from the current output of the generator, and means for controlling said variable resistance in response to differential electro-magnetic forces resulting from placing the intensity of the field current of the exciter in magnetic opposition to the intensity of the current output of the said generator; substantially as described.

4. The improvement in the art of regulating the field of an alternating current generator, which field is energized by an exciter, the same comprising, in combination a variable resistance in the field circuit of the exciter, a shunt around said variable resistance, said shunt having sectional resistance whose temperature coefficient is negative, means for controlling said variable resistance by differential electro-magnetic forces resulting from the magnetic opposition of the intensity of the field current of the exciter against the intensity of the current output of the generator, means for assisting the intensity of the field current of the exciter by the voltage of the current output of the generator, and means for cutting in or cutting out sections of the shunt resistance by energy derived from the current output of the generator; substantially as described.

5. The improvement in the art of regulating dynamo electric machines comprising a variable resistance in series with the field, and means for controlling said variable resistance in response to the intensity of the current output arranged in magnetic opposition to the intensity of the field current of the exciter, which latter is assisted by a circuit across the brushes of said exciter; substantially as described.

6. In a system for regulating the field circuit of a dynamo electric machine, the combination with a sectional resistance in said field circuit and a variable resistance in said field circuit, a working circuit, means controlled by said working circuit for varying the variable resistance in said field circuit, and means controlled by said work circuit for cutting in and cutting out portions of said sectional resistance; substantially as described.

7. In a system for regulating the field circuit of a dynamo electric machine, the combination with a sectional resistance and a variable resistance connected together in multiple series in said field circuit, a work circuit, means controlled by said work circuit for cutting in and cutting out sections of said sectional resistance, and means controlled by the work circuit for varying the variable resistance; substantially as described.

8. The improvement in the art of regulating dynamo electric machines comprising a resistance in series with the field, a magnet in the field circuit whose energy is exerted to increase said resistance, a supplementary coil on said magnet for assisting the action thereof to compensate for heat losses and maintain the voltage, and an opposing magnet tending to decrease said resistance, said opposing magnet being energized from the work circuit; substantially as described.

9. In a system for regulating the field circuit of dynamo electric machines, the combination with a variable resistance in series with the field of the exciter, two magnets in opposition to each other for varying said resistance, one of said magnets being in the field circuit of the exciter, and the other in the work circuit of the dynamo, a sectional resistance around said variable resistance, and a magnet in series with said second-mentioned magnet for successively cutting in and cutting out sections of said resistance; substantially as described.

10. A voltage regulating system comprising a dynamo, an exciter therefor, a variable resistance in series with the field of the exciter, two main magnets in opposition to each other for operating the said variable resistance, one of which is in the field circuit of the exciter, and the other in the work circuit of said dynamo, a sectional resistance around the said variable resistance, an auxiliary magnet in series with the second mentioned main magnet, means whereby the said auxiliary magnet automatically and successively cuts in and cuts out sections of the said sectional resistance by the action of the intensity of the current output of the said dynamo, and supplementary electro-magnetic means whereby the voltage of both the intensity of the exciter field current and the intensity of the current output of the said dynamo is made to assist the action of the first-mentioned main magnet; substantially as described.

In testimony whereof, I hereunto affix my signature, in the presence of two witnesses, this fifteenth day of June, 1906.

GEORGE S. NEELEY.

Witnesses:
LENORE WILSON,
GEORGE BAKEWELL.